United States Patent
Balliett et al.

(10) Patent No.: US 6,730,279 B2
(45) Date of Patent: May 4, 2004

(54) PRODUCTION OF PURE MOLYBDENUM OXIDE FROM LOW GRADE MOLYBDENITECONCENTRATES

(75) Inventors: Robert W. Balliett, Westborough, MA (US); Wolfgang Kummer, Goslar (DE); John E. Litz, Golden, CO (US); Lawrence F. McHugh, Wellesley, MA (US); Harry H. K. Nauta, TG Brielle (NL); Paul B. Queneau, Golden, CO (US); Rong-Chien Wu, Chelmsford, MA (US)

(73) Assignee: H. C. Starck, Inc., Newton, MA (US)

( * ) Notice: Subject to any disclaimer, the term of this patent is extended or adjusted under 35 U.S.C. 154(b) by 0 days.

(21) Appl. No.: 09/852,207

(22) Filed: May 9, 2001

(65) Prior Publication Data

US 2003/0086864 A1 May 8, 2003

(51) Int. Cl.$^7$ .............................................. C01G 39/00
(52) U.S. Cl. .......................................... 423/54; 423/56
(58) Field of Search .............................. 423/54, 55, 56, 423/593, 606, 49; 75/726

(56) References Cited

U.S. PATENT DOCUMENTS 3,455,677 A * 7/1969 Litz ............................ 423/54
4,046,852 A * 9/1977 Vertes et al. .................... 423/54
4,444,733 A * 4/1984 Laferty et al. ................. 423/54
6,149,883 A * 11/2000 Ketcham et al. ............... 423/54

* cited by examiner

Primary Examiner—Steven Bos
(74) Attorney, Agent, or Firm—Godfried R. Akorli; Diderico van Eyl (57) ABSTRACT

High purity ammonium dimolybdate or molybdenum oxide is produced by the pressure oxidation of low grade molybdenite concentrates or molybdenum intermediates. The process entails nearly complete oxidation of the sulfide minerals while optimizing the process chemistry and autoclave conditions to solubilize as little of the molybdenum values as possible. The autoclave discharge 12 is then subjected to a leaching step, either an alkaline leach 50, 400 or ammonium leach 250 process, before or after a liquid/solid separation step 20, 220, 410. The solution is then subjected to (a) filtration 60, 410, solvent extraction 70, 440, crystallization 90, 450, and calcination 120, 480 or (b) filtration 260, 280, crystallization 290, and calcination 320 to produce a product suitable for chemical-grade molybdenum oxide 125, 325, 485.

24 Claims, 3 Drawing Sheets

PRODUCTION OF PURE MOLYBDENUM OXIDE FROM LOW GRADE MOLYBDENITECONCENTRATES

FIELD OF THE INVENTION

The present invention relates to the process of producing ammonium dimolybdate for conversion to pure molybdenum oxide or other pure chemicals from molybdenite concentrates and more particularly to a process of producing chemical grade ammonium dimolybdate for conversion to chemical grade molybdenum oxide through a process that includes the pressure oxidation of low-grade molybdenite concentrates.

BACKGROUND OF THE INVENTION

Extraction of molybdenum from molybdenite-containing materials by an aqueous process has been the subject of study for over 50 years. In 1952, E. S. Usataya[1] reported on the oxidation of molybdenite in water solutions. He found that in neutral, acidic, or weakly alkaline solutions the decomposition products precipitate on the molybdenite surface and protect the molybdenite from further oxidation. He found that strong bases and strong oxidizing agents impede the formation of the protective layers. Increasing temperature accelerated the oxidation rate in alkaline solutions, but up to 60° C. had no effect in acidic solutions.

[1] Usataya, E. S., "Oxidation of molybdenite in water solutions," Zapiski Vsesoyuz Mineral Obshschestva, v 81, 298–303 (1952).

A Japanese patent[2] was issued for oxygen pressure oxidation (POX) of molybdenite in 1962. The example in this patent leached a 55.5% Mo, 36.4% S, and 4.4% Cu concentrate at 9% solids at 200° C. and 200 atmospheres oxygen. The molybdic acid precipitate that formed during leaching was dissolved using ammonia for recovery of an ammonium molybdate.

[2] Sada, Koji, "Extraction of molybdenum," Japanese patent 15.207('62), assigned to Awamura Mining Co., Ltd.

In another process disclosure[3], alkali hydroxide and alternatively ammonium hydroxide was added continuously to the aqueous solution to neutralize the acid as it formed and maintain the pH at 7–12. Other authors[4] postulated the formation of a molybdenum-iron heteropoly complex that decomposes as the acid concentration increases. It also may be a ferrous complex that decomposes as the soluble iron is oxidized to ferric.

[3] Hallada, Calvin J., et al., "Conversion of molybdenum disulfide to molybdenum oxide," German patent 2,045,308 (1971).
[4] Mel'nikov, B. S. and Shapiro, K. A., "Water-autoclave decomposition of molybdenite raw material," Protsessy Poluch. Rafinirovaniya Tugoplavkikh Met. (1975) 113–120, 253–260.

Early applications of molybdenum solvent extraction utilized tertiary amine to extract the molybdenum solubilized by sodium hydroxide leaching of roasted molybdenite calcines. Secondary amines and quaternary ammonium compounds extract anionic molybdenum using a similar chemistry. Amines also were used for extraction of molybdenum from molybdenite roaster scrubber solutions.

Molybdenum is an impurity in many uranium ores. When uranium ores are acid leached, some molybdenum reports to the acid leach solution. The tertiary amines readily available during the 1950's and early 1960's tended to have an amine-molybdenum complex with poor solubility in aliphatic diluents (kerosene).

Several Russian researchers worked with acid leaching of oxide ores. In many cases the acidity was sufficient for most of the molybdenum to be in a cationic form. Therefore, the cation exchanger (di, 2, ethylhexyl phosphoric acid (DEHPA)) received much study regarding the recovery of molybdenum from complex acid solutions. Karpacheva et al.[5] determined that in acid solutions the molybdenum was not present as the simple molybdenyl cation but, the molybdenum was present as polymeric cations. The co-extraction of iron is a major problem when using DEHPA. The authors noted that in a nitric acid system, the acid concentration needs to equal or exceed 3 molar to prevent significant iron extraction. Other authors[6] reported on the

[5] Karpacheva, S. M. et al., "Extraction of molybdenum and iron (III) by di-2-ethylhexyl hydrogen phosphate," Russian Journal of Inorganic Chemistry, V 12, 7, p 1014–1016 (1967).
[6] Chiola, Vincent, "Separation of molybdenum values from tungsten values by solvent extraction," U.S. Pat. No. 3,607,008 (1971). benefit of modifiers in reducing the iron coextraction, e.g. tributyl phosphate, dibutyl butyl phosphonate.

Palant et al.[7] made a detailed study of the extraction of molybdenum by DEHPA. The solutions studies were prepared by dissolving $MoO_3$ in sulfuric acid, hydrochloric acid, or nitric acid solutions.

[7] Palant, A. A. et al., "Extraction of molybdenum (VI) with bis(2-ethylhexyl) hydrogen phosphate from an acidic medium," Inst. Metall. im. Baikova, Moscow, USSR, Report deposited (1979) pp. 1–19.

Amine exchange has also received much study during the past 40 to 50 years. The difficulties presented by the poor solubility of the amine-molybdenum complex were addressed by using aromatic diluents. Macinnis et al.[8] used tri-n-capryl amine (ALAMINE 336) with the aromatic diluent #28[9]. The authors discuss amine extraction of a complex sulfate-bearing anion. At pH values of 3 and higher, they determined that the ion exchange type mechanism shown in Equation I below predominates.

$$2MoS_2 + 6H_2O + 9O_2 \rightarrow 2H_2MoO_4 \downarrow 4H_2SO_4 \qquad (I)$$

At pH values below 3, they postulate that the following occurs along with Equation I.

$$n(R_3NH.HSO_4) + (Mo_xO_yH_z)_n.(SO_4)_m \rightarrow$$
$$(R_3NH)_n.(Mo_xO_yH_z)_n.(HSO4)_n.(SO_4)_m \qquad (II)$$

[8] MacInnis, M. B., Kim, T. K., and Laferty, J. M., "The use of solvent extraction for the production and recovery of high-purity ammonium paramolybdate from normal alkali molybdate solution," First Intl Conf on Chemistry and Uses for Molybdenum, p. 56–58 (1973).
[9] Aromatic diluent #28 is a solvent from 1960 available from Missouri Solvents & Chemicals. The solvent had a boiling range of 165 to 193° C., a flash point of 122° F., a Kauri butanol value of 73, and was 74% aromatics.

Equation II infers that $(Mo_xO_yH_z)_n.(SO_4)_m$ is not ionized and MacInnis postulates some cation transfer. This postulation is based on the fact that $^{35}S$ tagged sulfur was found to transfer both from the organic to the aqueous phase and from the aqueous to the organic phase.

Litz found in 1970, that tris, tridecyl amine could be used successfully for molybdenum solvent extraction with an aliphatic diluent. There still was potential for formation of insoluble molybdenum-amine complexes, but the molybdenum-tris tridecyl amine complex's solubility in the diluent was much higher than with other tertiary amines. Tris tridecyl amine in an aliphatic diluent was used in a number of pilot circuits for molybdenum solvent extraction from roaster scrubber solutions and to recover byproduct from uranium leach solutions, but it may never have been used in a commercial circuit.

The transfer of sulfate from strongly acid solutions is a problem with using amines. Also, the amines are relatively nonselective and will transfer silicon, phosphorus, and arsenic probably as heteropoly compounds.

The coextraction of silicon and subsequent solids precipitation during stripping has been a major problem during other studies. The silicon problem was addressed by filtration of the first stripping stage mixture prior to advancing to the settler. Sulfate transfer was high because the solvent could not be fully loaded with molybdenum, i.e., to avoid diluent-insoluble molybdenum-amine complexes, the sulfate transfer was large.

Efficient recovery of chemical-grade ammonium dimolybdate (ADM) requires high purity feed solutions containing 200 to 230 g Mo per liter. Impurities in the solution must be removed to avoid inclusion in the ADM. Impurities, that form hydroxides or sulfides, can be removed by additions or pH-control. Other impurities will build up and unless the mother liquor is bled from the crystallization will report to the ADM.

Typical molybdenum solvent extraction systems acidulate the feed solution, if necessary, prior to contact with the extractant in the mixer. Generally this means that the extractant is converted to the bisulfate form by acid in the feed solution and then the desired anion exchanges with the bisulfate. When molybdenum is acidulated there is potential for localized high acid concentrations that can form sulfate-bearing molybdenum species.

It is an object of the present invention to provide an integrated process for producing high purity ammonium dimolybdate or molybdenum oxide through a process that includes the pressure oxidation of low grade molybdenite concentrates or molybdenum intermediates.

It is a further object of the present invention to provide an improved molybdenum pressure oxidation process which produces a high purity product at reduced capital and operating costs.

It is a further object of the present invention to provide an improved solvent extraction method which rejects sulfate and metallic impurities by extracting the molybdenum in an ionic form that contains no sulfate.

SUMMARY OF THE INVENTION

The objects set forth above as well as further and other objects and advantages of the present invention are achieved by the present invention now described in summary fashion and with further examples below in preferred embodiments of the practice of the invention.

The present invention provides a process of producing a high purity ammonium dimolybdate or molybdenum oxide through the pressure oxidation of low grade molybdenite concentrates or molybdenum intermediates. The process entails oxidizing the molybdenite concentrates or intermediates in an autoclave operating at greater than 50 p.s.i. oxygen overpressure, preferably between 80–120 p.s.i., at a temperature greater than 200° C., preferably between 210–220° C. to effect almost complete oxidation of the concentrate while optimizing the process chemistry and autoclave conditions to solubilize as little of the molybdenum values as possible. A method of maximizing the insoluble molybdenum values is disclosed in U.S. patent application entitled "Autoclave Control Mechanisms for Pressure Oxidation of Molybdenite" which is incorporated by reference herein (and a copy of which is provided at Appendix A hereto). The resulting autoclave discharge has greater than 99% of the molybdenum concentrates oxidized and greater than 80% of the molybdenum values insoluble.

The autoclave discharge is then subjected to an alkaline leaching of the POX residue using sodium carbonate and sodium hydroxide. More than 99% of the molybdenum dissolves. The molybdenum in this alkaline solution is recovered readily using a secondary amine solvent, ditridecyl amine (DTDA). The molybdenum is loaded into the organic phase at 4.0 to 4.5 pH. The molybdenum-loaded organic is stripped with ammonium hydroxide to produce solutions suitable for recovery of chemical-grade ADM and ultimately chemical-grade molybdenum oxide.

Alternatively, the autoclave discharge may be subjected to an ammoniacal leaching of the POX residue. More than 99% of the molybdenum dissolves. Most of the cosolubilized impurities are precipitated from the ammoniacal leach solution. The solution is evaporated to crystallize chemical grade ADM. An additional route is provided when the leach solution contains more sulfate than is desirable for crystallization of chemical-grade ADM, producing a product suitable for technical grade ADM and ultimately technical grade molybdenum oxide.

Alternatively, the POX residue may be subjected to an alkaline leach with sodium carbonate and sodium hydroxide before a liquid-solid separation step such that all of the molybdenum is soluble and the copper and iron transfer to the solids. More than 98% of the molybdenum is transferred to the filtrate from this neutralization. The molybdenum is readily recoverable using the DTDA solvent extraction process. The ammoniacal strip solutions from the DTDA extraction are suitable for recovery of chemical-grade ADM and ultimately chemical-grade molybdenum oxide.

Cementation by scrap iron can be used to readily recover the copper either from the raffinate produced from molybdenum solvent extraction of the POX leach solution or directly from the POX leach solution. Gold and silver values transfer to the final leached solid residue produced by each embodiment and are recyclable to a copper smelter. Most of the rhenium, arsenic, and phosphorus are dissolved regardless of the leaching conditions.

Other objects, features and advantages of the invention will be apparent from the following description of preferred embodiments thereof, including illustrative non-limiting examples of the practice of the process.

DETAILED DESCRIPTION OF THE PREFERRED EMBODIMENT

Figure 1:
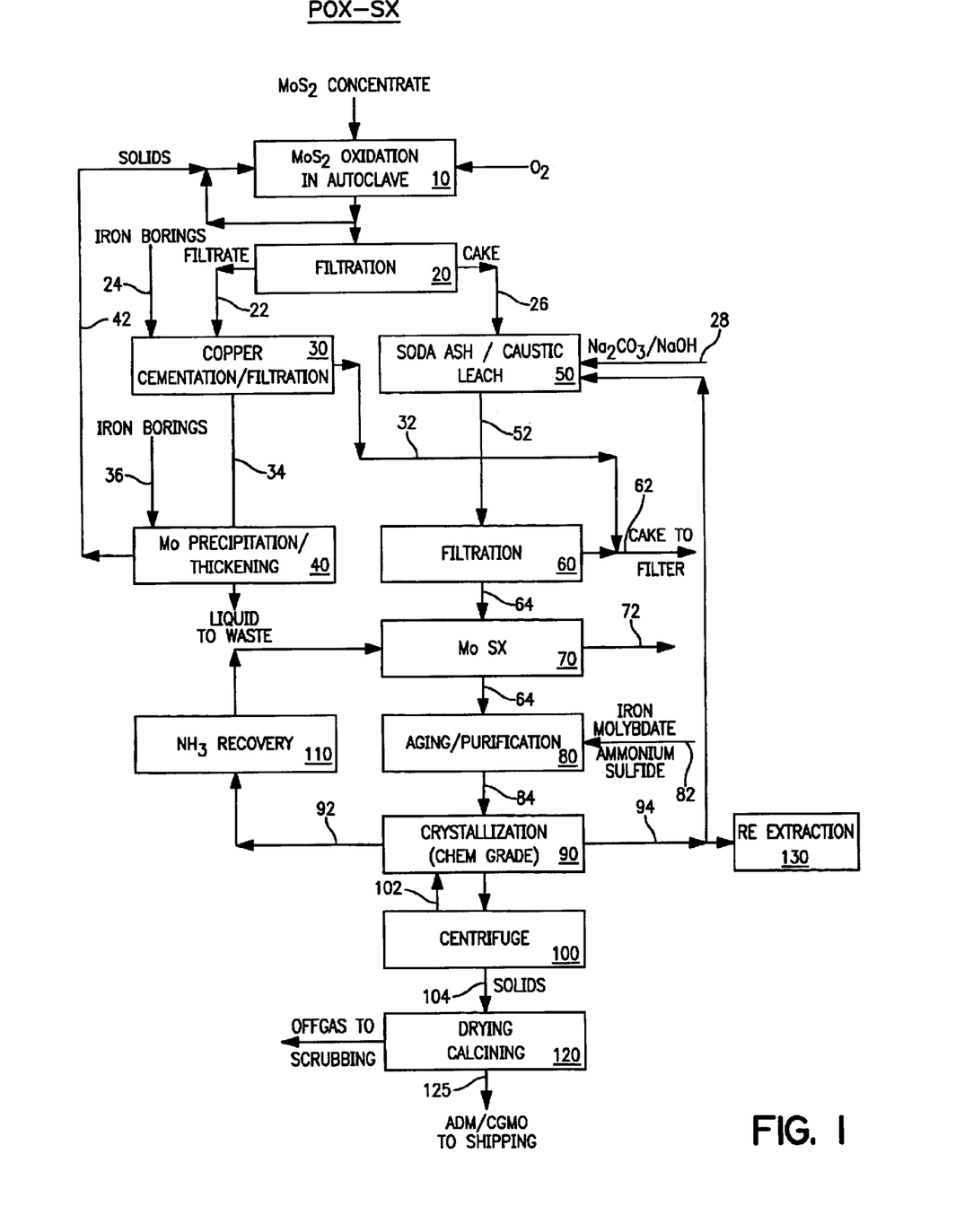
FIG. 1 is a flow diagram of one embodiment of the process of the present invention in which the POX residue is subjected to an alkaline leach.

A process of producing a pure ammonium dimolybdate or molybdenum oxide through the pressure oxidation of low-grade molybdenite concentrates is provided in a first embodiment. Referring to FIG. 1, the process begins with the pressure oxidation 10 of low grade molybdenite concentrate or intermediate concentrates at greater than 50 p.s.i. oxygen overpressure, preferably between 80–120 p.s.i., at a temperature greater than 200° C., preferably between 210–220° C. while optimizing the process chemistry and autoclave conditions to solubilize as little of the molybdenum values as possible. This can be accomplished by a high degree of oxidation of sulfide sulfur in the autoclave and acceptably high $H_2SO_4$ concentrations.

Treated water and recycle wash water from the autoclave filter is added to dilute the feed to the autoclave in order to control the temperature in the autoclave. Recycling a portion of the autoclave discharge slurry 12 back to the autoclave increases the acidity and ferric level in the autoclave. The recycled autoclave discharge aqueous accelerates the leaching rate, thus reducing the reactor size, and the additional acid limits the soluble molybdenum to about 15% of the total. Recycling some of the autoclave slurry 12 back to the autoclave also provides seeding material to increase the size of the $MoO_3$ particles to improve filterability. The resulting autoclave discharge has greater than 99% of the molybdenum concentrates oxidized and greater than 80% of the molybdenum values insoluble.

The autoclave discharge slurry is then filtered 20 and the filtrate 22 is treated by scrap iron 24 to precipitate the copper. The cementation process 30 begins by adding the iron 24 to the liquid 22 at room temperature. The scrap iron reacts with the filtrate according to the following equations.

$$Fe + 2Fe^{3+} \rightarrow 3Fe^{2+} \qquad \text{II}$$

$$Fe + Cu^{2+} \rightarrow Cu + Fe^{2+} \qquad \text{(IV)}$$

The recovered copper precipitate will be filtered, washed, and sent to a smelter 32. The chemistry of tail stream 34 from iron cementation 30 is then adjusted and molybdenum is precipitated using metallic iron powder 36 in a stirred tank reactor 40. This product 42 is recycled back to the autoclave feed. If the cementation process 30 is not used, then the filtrate 22 advances directly to the molybdenum precipitation process 40.

The insoluble molybdenum values 26 in the POX residue are present as hydrated and anhydrous molybdenum oxides and are readily soluble in alkaline solutions. The autoclave discharge filter cake 26 is then repulped in water and a soda ash solution 28 is added to dissolve the molybdenum 50. Sodium carbonate alone dissolves most of the molybdenum at final pH values below 7.0 but a significant amount of iron was also found to dissolve. Sodium hydroxide is then added to increase the pH level to about 9.0 to 10.0, eliminating the soluble iron and producing a leach slurry having low arsenic, phosphorus, and selenium content. The amount of soluble silicon is variable.

The discharge 52 from the soda ash/caustic leach 50 is then filtered and washed 60. The filter cake 62 is sent to the smelter for recovery of precious metals. The filtrate 64 is sent to solvent extraction 70.

The sodium molybdate solution 64 produced by the alkaline leach 50 is subjected to an amine solvent extraction 70 of the molybdenum. The molybdenum extraction mixers can be operated to produce a two-phase mixture having either the aqueous- or organic-phase continuous. The organic phase contains 10% DTDA. Controlling the acidity in the mixers at 4.0 to 4.5 pH by the direct addition of hydrated sulfuric acid (65% $H_2SO_4$ or so) minimizes the transfer of arsenic, phosphorus, selenium, silicon, and sulfate. The molybdenum-loaded organic then is washed with a weak acid solution and/or water, and then is stripped with an ammonium hydroxide solution. Concentrated ammonium hydroxide or anhydrous, gaseous ammonia is added to control the pH in stripping at about 9.0. After stripping, the organic is water-washed to remove entrained strip solution and the aqueous is advanced as make-up water to stripping.

The ideal solvent molybdenum extraction rejects sulfate and metallic impurities. The most efficient method of rejecting sulfate is to extract the molybdenum in an ionic form that contains no sulfate. Typical solvent extraction systems acidulate the feed solution, if necessary, prior to contact with the extractant in the mixer. Generally this means that the extractant is converted to the bisulfate form and then the desired anion exchanges with the bisulfate. In addition, when molybdenum-bearing solutions are acidulated there is potential for localized high acid concentrations that can form sulfate-bearing molybdenum specie.

The molybdenum ion present in neutral to alkaline solutions is the molybdate ion. On mild acidulation to 4.0 to 4.5 pH, the molybdenum will form large polymolybdate ions that are readily extractable. If the acidulation of the feed solution is done simultaneously in the mixer to produce a two-phase mixture, the extractant quickly exchanges the polymolybdate species before the molybdenum is further acidulated to form a sulfate-bearing specie. Typically the metallic impurities will not form large polyions at the target pH values and, if they do, the polymolybdates will displace them along with any bisulfate ions from the amine. Therefore, small amounts of sulfate and silicon are the only impurities that follow the molybdenum.

Raffinate 72 from the solvent extraction is sent to the disposal tank for neutralization and disposal with the other effluents from the plant. The pregnant liquor 74 from the solvent extraction 70 advances to the aging and purification tanks 80 to allow silica to coagulate. Iron molybdate and/or ammonium sulfide 82 may be added to the aging tanks to reduce the amount of trace impurities.

The aged and purified solution 84 is then sent to a crystallizer 90 where solid ammonium dimolybdate (ADM) is produced. The crystals are recovered in a centrifuge 100. The vapor 92 from the crystallizer 90 is condensed to recover the ammonia 110 for use in the solvent extraction process 70. The filtrate 102 from the centrifuge is recycled back to the crystallizer 90. As an option, a bleed stream 94 from the crystallizer circuit can be taken to recover rhenium values in a rhenium extraction process 130 and/or the bleed stream 94 can be neutralized with soda ash and steam-stripped to recover and recycle the ammonia. The ammonia-free solution then is returned to the alkaline leach 50.

In the rhenium extraction process 130, the rhenium is extracted from the crystallizer mother liquor bleed in ion exchange columns. Stripping is done with ammonia. The strip solution is sent to a crystallizer to recover the rhenium as solid ammonium perrhenate.

The crystals 104 from the crystallizer centrifuge 100 are transported to a dryer/calciner 120. The dried/calcined material may then be sent to packaging. The resulting material is suitable for chemical grade ADM or chemical grade molybdenum oxide 125. Table I below shows the requirements for chemical grade molybdenum oxide in comparison to technical grade molybdenum oxide.

TABLE 1

|  | Technical Grade $MoO_3$ Spec | Chemical Grade $MoO_3$ Spec |
|---|---|---|
| Al, max. ppm | — | 10 |
| Ca, ppm | — | 5 |
| Co, ppm | — | 10 |
| Cr, ppm | — | 5 |
| Cu, ppm | 4500 | 5 |
| Fe, ppm | — | 10 |
| K, ppm | — | 80 |
| Mg, ppm | — | 5 |
| Mn, ppm | — | 10 |
| Ni, ppm | — | 5 |
| P, ppm | 200 | 10 |
| Pb, ppm | 300 | 10 |
| S, ppm | 300 | — |
| Si, ppm | 20,000–40,000 | 10 |
| Sn, ppm | — | 10 |
| Ti, ppm | — | 5 |

TABLE 1-continued

|  | Technical Grade MoO$_3$ Spec | Chemical Grade MoO$_3$ Spec |
|---|---|---|
| V, ppm | — | 10 |
| Zn, ppm | — | 10 |
| Zr, ppm | — | 10 |

Figure 2:
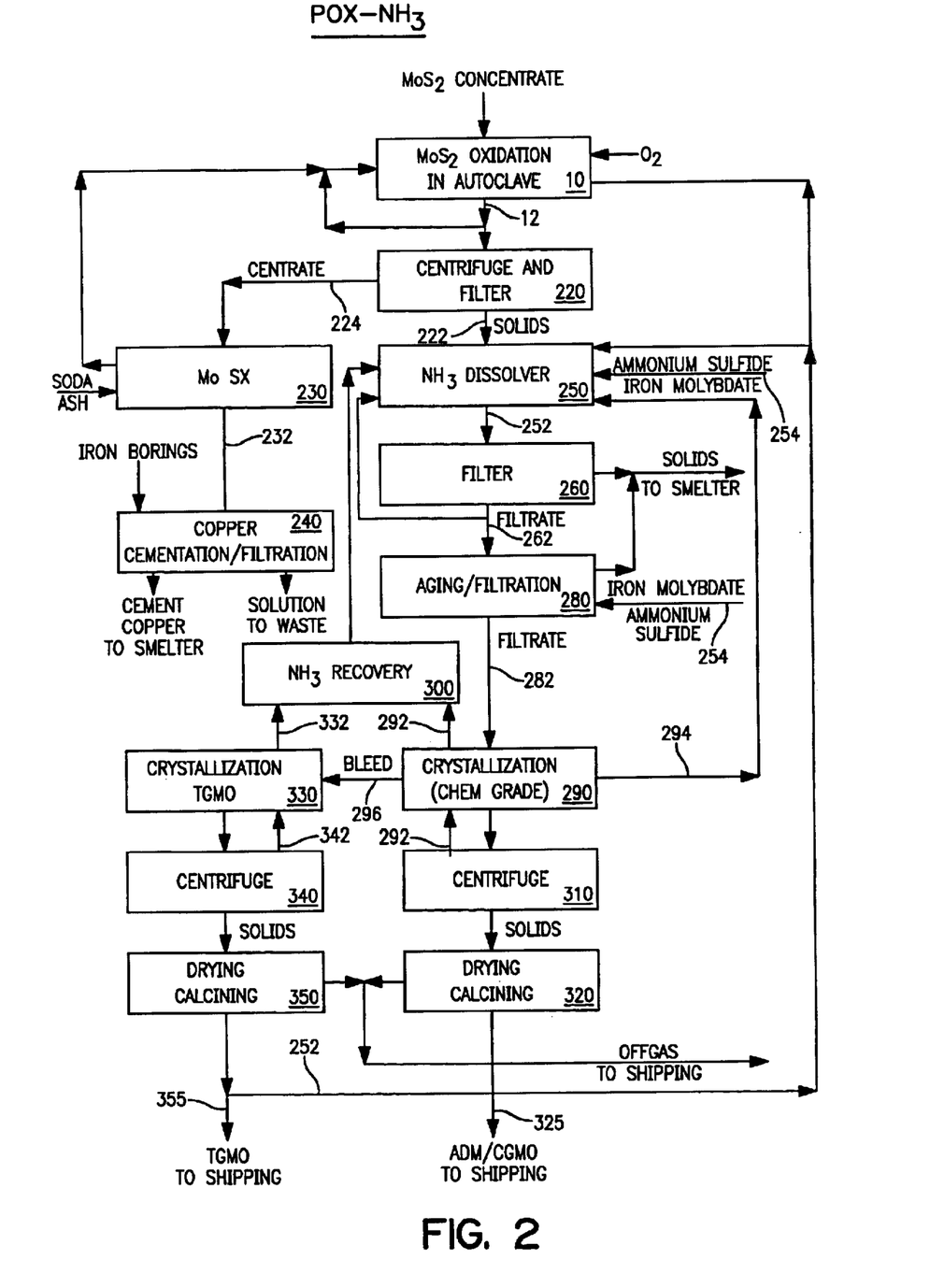
FIG. 2 is a flow diagram of another embodiment of the process of the present invention in which the POX residue is subjected to an ammoniacal leach.

Referring to FIG. 2, in another embodiment of the present invention, the autoclave discharge 12 is centrifuged and washed and then repulped, filtered and washed again 220. The purpose is to obtain a molybdenum-containing filter cake 222 which is low in soluble impurities such as silicon and sulfate. The centrate 224, which contains almost all of the copper and much of the iron from the feed, plus the balance of the molybdenum, is sent to the optional solvent extraction process 230 for molybdenum recovery. The solvent extraction process is essentially the same as described in the first embodiment except the stripping is done with a concentrated sulfuric acid solution rather than an ammonium hydroxide solution. During stripping, the pH is maintained at about less than 3.0. Recovered molybdenum values are recycled back to the autoclave feed. Raffmate 232 from the solvent extraction 230 advances to copper recovery 240, followed by molybdenum precipitation by scrap iron. If the solvent extraction process 230 is not used, then the solution advances directly to copper recovery 240.

The filter cake 222 is contacted with ammonium hydroxide solution and anhydrous ammonia 250 rather than the soda ash/caustic leach solution 50 of the first embodiment. The solid molybdic oxide dissolves to form soluble ammonium molybdate. The residue after dissolution is the insoluble portion. The dissolver slurry 252 advances to a continuous filter 260. Some filtrate 262 may be recycled to reduce the solids concentration in the dissolver 250. Both iron molybdate and ammonium sulfide 254 may be added to either the dissolver 250 or the aging tanks 280. These two reagents precipitate trace impurities.

The filtrate 262 from the dissolver filter 260 goes to a control tank with a recycle stream back to the dissolver to maintain proper specific gravity and pH. The filtrate from the control tank then goes to the aging and purification tanks 280 to allow silica to coagulate.

The aged and purified solution 282 is then sent to a crystallizer 290 where solid ammonium dimolybdate (ADM) is produced. The crystals are recovered in a centrifuge 310. The vapor 292 from the crystallizer 290 is condensed to recover the ammonia 300 for use in the dissolver 250. The majority of the mother-liquor filtrate 312 from the centrifuge 310 is recycled to the crystallizer 290. The crystals from the crystallizer centrifuge 310 are transported to a dryer/calciner 320. The dried/calcined material results in chemical grade ADM or chemical grade molybdenum oxide 325.

A part of the mother-liquor filtrate is used as a continuous bleed stream 294 from the crystallizer circuit to control impurities in the mother liquor in the crystallizer 290. This bleed stream 294 is sent back to the dissolver 250 to precipitate the build-up of impurities. If there is a build-up of impurities which can not sufficiently be precipitated in the dissolver/aging circuit, a part of the bleed stream 296 is sent to a second crystallizer 330 to produce an impure ADM. The crystals from the second crystallizer 330 are recovered in a centrifuge 340. The vapor 332 from the second crystallizer 330 is condensed to recover the ammonia 300 for use in the dissolver 250. The crystals from the second crystallizer centrifuge 340 are transported to a dryer/calciner 350. The calcined material results in technical grade ADM or technical grade molybdenum oxide 355, which can be sold or recycled back 252 to the dissolver 250 or the autoclave 10.

Figure 3:
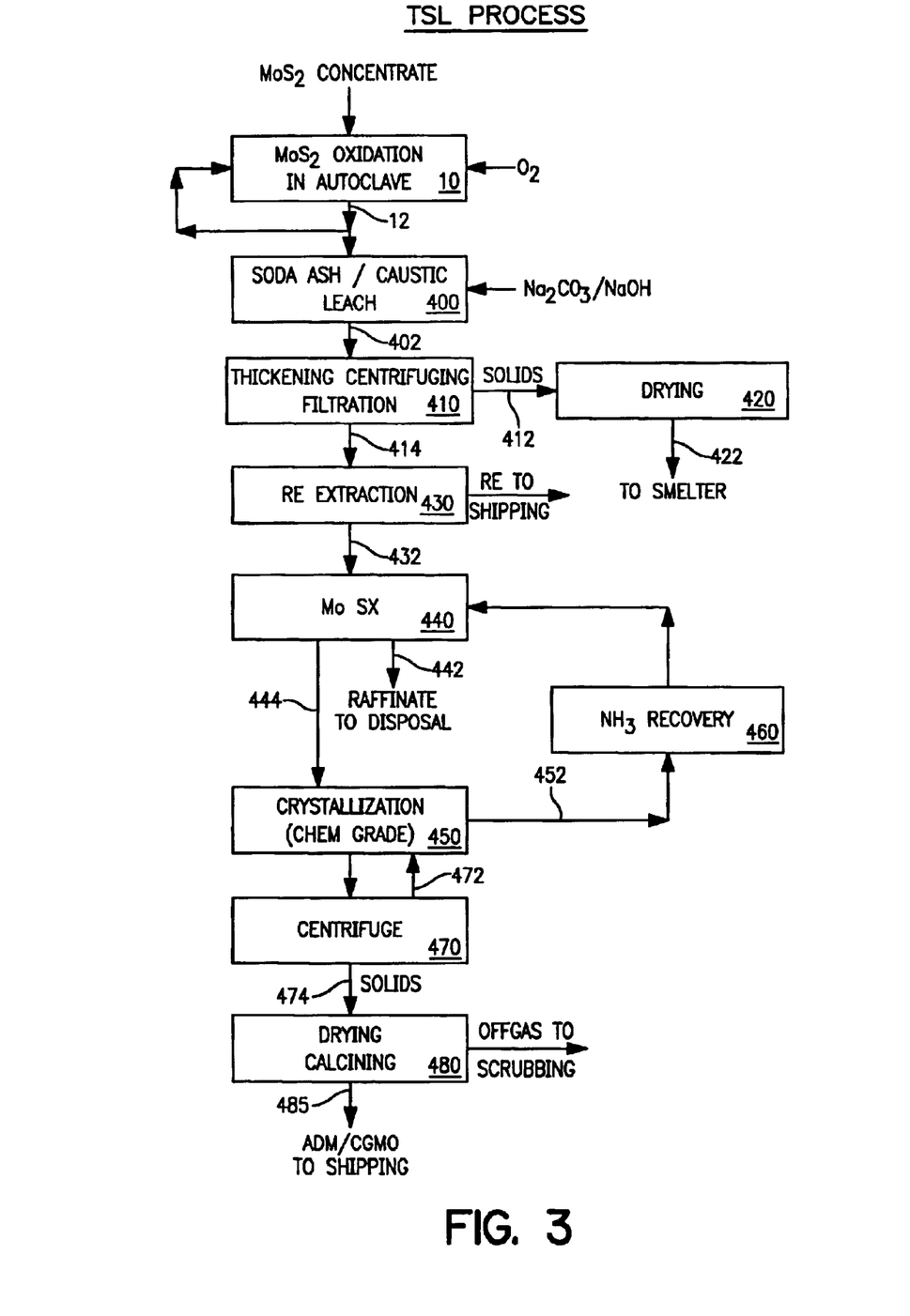
FIG. 3 is a flow diagram of another embodiment of the process of the present invention in which the POX residue is subjected to an alkaline leach prior to liquid-solid separation.

Referring to FIG. 3, in another embodiment of the present invention, the autoclave discharge 12 is subjected to the sodium carbonate/sodium hydroxide leaching process 400 of the first embodiment prior to liquid-solid separation. The leaching discharge 402 is then thickened, centrifuged and washed, repulped, filtered on a continuous pressure filter and rewashed 410. The solids 412 containing the copper and gold are sent to the smelter 422 for recovery. The filtrate 414 containing the molybdenum and rhenium is sent to a rhenium extraction process 430. The rhenium is extracted from the alkaline filtrate in ion exchange columns. Stripping is done with ammonia. The strip solution is sent to a crystallizer to recover the rhenium as solid ammonium perrhenate.

The molybdenum-bearing solution 432 from rhenium extraction 430 is pumped to the solvent extraction process 440 previously described in the first embodiment. The raffinate 442 from the solvent extraction 440 is sent to the plant effluent. The pregnant liquor 444 is sent to the crystallization process 450 previously described in the first embodiment producing chemical grade ADM or chemical grade molybdenum oxide 485.

EXAMPLES

The invention is now further disclosed with reference to the following non-limiting Examples.

Example 1

Cementation Process

After pressure oxidation of the molybdenite concentrate in the autoclave and the solid-liquid separation of the slurry, the resulting acidic liquid is treated by cementation. The major constituents of the liquid are approximately:

| Mo, g/l | 10–16 |
|---|---|
| Cu, g/l | 8–11 |
| Fe, g/l | 8–11 |
| H$_2$SO$_4$, g/l | 100 |

The cementation process is conducted at room temperature and begins by adding to the liquid about 1.0 gram Fe per gram Fe present (as $Fe^{3+}$) in the liquid and about 2.0 gram Fe per gram Cu present in the liquid. The slurry is mixed for 10–15 minutes and then filtered. The solids contain the recovered Cu-values. The filtrate is then treated for the recovery of Mo.

The pH of the filtrate is increased to about 1.05–1.2 by the addition of $Na_2CO_3$ or NaOH and the temperature of the filtrate is increased to about 40–65° C. An additional 1.5–2.1 gram Fe per gram Mo present in the liquid is then added. The slurry is mixed for 15–30 minutes and filtered. The filtrate should have a clear yellow/greenish color. A recycle stream, which feeds solids or slurry back to the mix-tank is needed to promote the filterability of the Mo-cake. The solids contain the recovered Mo-values. The filtrate can be neutralized with lime and discarded. The mass distribution in % of the elements is shown in Table 2.

TABLE 2

| Element | Starting acidic liquid | Cu-step, Solids | Cu-step, Liquid | Mo-step, Solids | Mo-step, Liquid | Notes |
|---|---|---|---|---|---|---|
| Mo | 100 | 1–1.5 | 98.5–99 | 98.4 | 0.07–0.24 | |
| Cu | 100 | 98.5–99.99 | 0–1.5 | <0.01 | 0.01 | |
| Si | 100 | | | 15 | 85 | |
| As | 100 | | | 85 | 15 | |
| Se | 100 | | | 100 | 0 | (* |
| Re | 100 | | | 50 | 50 | (* |
| SO4 | 100 | | | 2 | 6–20 | (* |
| P | | | | 35 | 65 | (** |
| Mg | | | | 30 | 70 | (** |
| Al | | | | 10 | 90 | (** |

Notes:
(* = The liquid phase is not analyzed, but based on the synthetic solutions it is assumed that the distribution of the elements are as is indicated.
(** = The distribution only indicates the relative distribution between the two solid phases.

Example 2

Alkaline Leach

A number of tests were performed to attempt optimization of the leaching conditions while minimizing the formation of bicarbonates. The alkaline leaching data are summarized in Table 3. Leaching at pH values below 7.0 using sodium carbonate demonstrated almost complete solubilization of the molybdenum but significant co-solubilization of iron, probably as a carbonate complex, was also present. Leaching with sodium hydroxide did not solubilize much iron. Therefore, tests to optimize leaching cost and efficiency evaluated an initial leach with sodium carbonate to 6 pH, followed by sodium hydroxide to 9 pH or only using sodium hydroxide. Molybdenum extraction in these tests (see Table 3, Leach No. CL-1 to CL-6) exceeded 98%. The leach solutions contained 43 to 79 g/l Mo and silicon was the only impurity of significance. The reagent requirement averaged about 1.1 lb $Na_2CO_3$ and 0.7 lb NaOH per lb of molybdenum dissolved.

Example 3

Alkaline Leach Solvent Extraction

A number of tests were performed to determine the optimum conditions for solvent extracting molybdenum from the alkaline leach solutions. The molybdenum solvent extraction studies used an organic containing 10% ditridecyl amine, 5% decyl alcohol, and 85% Escaid 110. The results of these studies are summarized in Tables 4A–4C. The initial tests evaluated the effect of temperature in the pH range of 2.0–2.7. Temperature had no significant effect on the molybdenum extraction. The extraction was very efficient with raffinates containing from 1 to 40 mg molybdenum/liter from feed solutions containing 63 to 70 g/l (greater than 99.9% transfer). The distribution coefficients in the first contact, freshly stripped organic and feed, were as high as 133 (g/l Mo organic phase÷g/l Mo aqueous phase). There was some transfer of silicon and arsenic. The first strip stages contained up to 310 mg/l silicon and 12 mg/l arsenic when normalized to 200 g/l molybdenum.

TABLE 3

ALKALINE LEACHING OF POX LEACH RESIDUE
MOLYBDENUM EXTRACTION AND LEACH SOLUTION IMPURITIES

| Leach No.: | Temp °C. | Dissolution $Na_2CO_3$ to ? pH | NaOH to ? pH | Soluble Mo | $Na_2CO_3$ g/g Mo | NaOH g/g Mo | Filtrate Mo, g/l | Cu | Fe | As | K | P | Re | Mg | Si | Se |
|---|---|---|---|---|---|---|---|---|---|---|---|---|---|---|---|---|
| RL-30 | 50 | | 13 | 95.6% | | 0.95 | 65.3 | | 18 | 13 | | | 37 | | 172 | |
| RL-31 | 50 | | 13 | 91.9% | | 0.84 | 93.6 | | 4 | | | | | | 235 | |
| RL-32 | 50 | 6.8 | | 99.6% | 1.31 | | 33.4 | | 24 | | | | | | 72 | |
| RL-33 | 50 | 5.2 | | 99.9% | 0.68 | | 31.6 | | 1500 | 25 | | | | | 468 | |
| RL-34 | 50 | 3.5 | | 94.5% | 0.38 | | 32.2 | | 1500 | 25 | | | | | 200 | |
| RL-35 | 50 | 4.3 | | 99.5% | 0.39 | | 48.4 | | 1300 | 8 | | | | | 314 | |
| RL-36 | 50 | | 6.5 | 98.5% | | 0.59 | 76 | | 1040 | 10 | | | | | 550 | |
| RL-37 | 50 | | 8.05 | 99.6% | | 1.00 | 81.9 | <3 | 7 | 10 | | | | | 100 | |
| RL-38 | 50 | | 9.54 | 99.8% | | 0.99 | 83.1 | <3 | 5 | 14 | | | | | 140 | |
| RL-39 | 50 | | 10 | 95.6% | | 1.00 | 74.8 | <3 | 5 | 5 | 45 | 11 | | 27 | 350 | |
| CL-1 | 50 | 5.6 | 9.2 | 98.0% | 1.04 | 0.72 | 67.1 | | 12 | | | | | | 1500 | |
| CL-2 | 50 | 5.6 | 9.4 | 98.6% | 1.04 | 0.76 | 58.6 | | 14 | | | | | | 2400 | |
| CL-3 | 50 | | 10 | 98.1% | | 1.18 | 74.2 | | 11 | | | | | | 890 | |
| CL-4 | 50 | | 9.6 | 98.4% | | 1.03 | 78.8 | | 10 | | | | | | 470 | |
| CL-5 | 50 | 9.0 | 9.3 | 98.9% | 1.52 | 0.18 | 42.9 | | 10 | | | | | | 325 | |
| CL-6 | 50 | 6.9 | 9.5 | 99.0% | 1.16 | 0.33 | 71.1 | | 39 | 6 | | 124 | | | 28 | 28 |

TABLE 4A

SOLVENT EXTRACTION SUMMARY
ALKALINE LEACH SOLUTIONS

| Test No | pH | Temp °C | | Mo Content, g/l Organic | Mo Content, g/l Aqueous | H$_2$SO$_4$ g/g Mo | Impurities In strip, mg/l per 200 g/l Mo Si | As | P | Re | SO$_4$ |
|---|---|---|---|---|---|---|---|---|---|---|---|
| 1210 | | 35 | Feed | | 82 | | 110 | <u>8</u> | | | |
| | 4.8 | | Loaded Stage | 41.5 | 55 | | ≤2 | <u>6</u> | <u>1.5</u> | | |
| | | | First Contact | 27.8 | 28 | 0.8 | ≤2 | <u>6</u> | <u>0.7</u> | | |
| | 2.5 | | Raffinate Stage | 0.22 | <0.001 | | ≤2 | <u>4</u> | <u>0.05</u> | | |
| | | | First Strip Stage, 8.5 pH | 3 | 81 | | 260 | 25 | <u>6.4</u> | | |
| | | | Second Strip Stage, 9.5 | 0.6 | 7 | | ≤55 | 230 | <u>10</u> | | |
| 1220 | | | Feed | | 34 | | | | | | |
| | 2.5 | | Loaded Stage | 45.6 | 30 | | | <u>4</u> | | | |
| | 2.5 | | First Contact | 22.5 | 0.02 | 0.41 | | ≤2 | | | |
| | 2.5 | | Raffinate Stage | 0.01 | <0.001 | | | ≤2 | | | |
| | | | First Strip Stage, 8.5 pH | 4.1 | 86 | | | <u>9</u> | | 107 | |
| | | | Second Strip Stage, 9.0 | 0.3 | 11 | | | <35 | | | |
| 1230 | | 25 | Feed | | 45 | | 76 | <u>2</u> | | | |
| | 2.5 | | Loaded Stage | 45 | 47 | | ≤2 | <u>4</u> | | | |
| | 2.5 | | First Contact | 29.6 | 0.08 | | ≤2 | ≤2 | | | |
| | 2.5 | | Raffinate Stage | 0.01 | 0.02 | | ≤2 | <u>4</u> | | | |
| | | | First Strip Stage, 8.5 pH | 9.7 | 65 | | 215 | <u>6</u> | | | |
| | | | Second Strip Stage, 9.0 | 1.5 | 23 | | 70 | ≤15 | | | |
| 1410 | | 35 | Feed | | 83 | | 275 | <u>6</u> | | | 1700 |
| | 4.2 | | Loaded Stage | 53.5 | 61 | | | | | | |
| | 4.4 | | First Contact | 16.6 | 0.13 | | | | | | |
| | | | First Strip Stage, 9.0 pH | 1.0 | 183 | | 164 | u | u | | 39 |
| | | | Second Strip Stage, 9.0 | 0.1 | 6 | | 870 | 200 | <u>≤30</u> | | 370 |
| | | | | | | | | | | | Re |
| 1420 | | 35 | Alkaline Feed | | 61 | | <u>10</u> | <u>14</u> | <u>2</u> | 10 | 44 |
| | | | POX Leach Feed | | 11 | | 80 | 60 | 54 | 26 | 16 |
| | 4.4 | | Alkaline Contact | 42.4 | 25 | | ≤2 | <u>8</u> | ≤1 | 44 | 20 |
| | | | First POX Contact | 7.3 | 0.33 | | 50 | 22 | 28 | 3 | <2 |
| | 9.1 | | Strip of Alkaline Contact | 4.3 | 104 | | 31 | 510 | 310 | 200 | 173 |
| | | | Alkaline Raff Contact | 22.7 | 0.39 | | ≤2 | <u>6</u> | <1 | <1 | <1 |
| | 9.0 | | Strip of Alkaline Raff Co | 0 | 46 | | ≤9 | 26 | 9 | <u>≤9</u> | 35600 |

TABLE 4B

SOLVENT EXTRACTION SUMMARY
ALKALINE LEACH SOLUTIONS

| Test No | pH | Temp °C | | Mo Content, g/l Organic | Mo Content, g/l Aqueous | H$_2$SO$_4$ g/g Mo | Impurities In Strip, mg/l per 200 g/l Mo Si | As | P | Re |
|---|---|---|---|---|---|---|---|---|---|---|
| 1030 | | 50 | Feed | | 70 | | 56 | <u>6</u> | <u>na</u> | 12 |
| | 2.1 | | Loaded Stage | 46.0 | 1.29 | | ≤2 | <u>6</u> | <u>0.4</u> | <u>4</u> |
| | 1.4 | | Raffinate Stage | 0.06 | <0.001 | | ≤2 | <u>6</u> | <u>0.05</u> | <2 |
| | | | First Strip Stage, 6.5 pH | 21 | 39 | | ≤10 | <u>≤10</u> | <u>5</u> | 41 |
| | | | Second Strip Stage 9.0 p | 8 | 23 | | 313 | 35 | 42 | <17 |
| 1040 | | 50 | Feed | | 70 | | 56 | <u>6</u> | na | 12 |
| | 2.6 | | Loaded Stage | 41.6 | 7.62 | | ≤2 | <u>6</u> | <u>0.3</u> | 4 |
| | 2.6 | | Raffinate Stage | 0.12 | 0.016 | | ≤2 | ≤2 | <u>0.2</u> | <2 |
| | | | First Strip Stage, 6.5 pH | 14 | 43 | | ≤9 | <u>≤9</u> | <u>7</u> | 37 |
| | | | Second Strip Stage, 9.0 p | 0.5 | 20 | | 380 | <u>≤20</u> | <u>25</u> | <20 |
| 1070 | | 35 | Feed | | 65 | | 56 | <u>6</u> | | |
| | 2.6 | | Loaded Stage | 43.3 | 0.32 | | ≤2 | | | |
| | 2.8 | | Raffinate Stage | 0.05 | 0.11 | | ≤2 | | | |
| | | | First Strip Stage, 8.5 pH | 9.8 | 63 | | 146 | <u>6</u> | | |
| | | | Second Strip Stage, 9.5 p | 5.6 | 12 | | ≤30 | <u>≤30</u> | | |
| 1080 | | 20 | Feed | | 63 | | 56 | <u>6</u> | | |
| | 2.7 | | Loaded Stage | 40.9 | 0.85 | | <u>2</u> | | | |
| | 2.7 | | Raffinate Stage | 0.01 | 0.003 | | <u>2</u> | | | |
| | | | First Strip Stage, 8.5 pH | 9.9 | 72 | | 89 | <u>6</u> | | |
| | | | Second Strip Stage, 9.5 p | 0.1 | 1.2 | | <300 | <300 | | |
| 1090 | | 35 | Feed | | 70 | | 56 | <u>6</u> | | 12 |
| | 2.1 | | Loaded Stage | 46.5 | 0.35 | | ≤2 | <u>6</u> | | 2 |
| | 2.0 | | Raffinate Stage | 0.009 | 0.001 | | ≤2 | <u>4</u> | | 2 |
| | | | First Strip Stage, 8.5 pH | 11.8 | 73 | | 142 | <u>5</u> | | |
| | | | Second Strip Stage, 9.5 p | 0.37 | 34 | | 200 | <u>≤5</u> | | |

TABLE 4B-continued

SOLVENT EXTRACTION SUMMARY
ALKALINE LEACH SOLUTIONS

| Test | | Temp | | Mo Content, g/l | | $H_2SO_4$ | Impurities In Strip, mg/l per 200 g/l Mo | | | |
|---|---|---|---|---|---|---|---|---|---|---|
| No | pH | °C | | Organic | Aqueous | g/g Mo | Si | As | P | Re |
| 1100 | | 20 | Feed | | 65 | | 56 | 6 | | 12 |
| | 1.95 | | Loaded Stage | 41 | 3.7 | | ≤2 | 6 | | 2 |
| | 2.00 | | Raffinate Stage | 0.03 | 0.04 | | ≤2 | 4 | | <2 |
| | | | First Strip Stage, 8.5 pH | 25.6 | 32 | | 310 | 12 | | |
| | | | Second Strip Stage, 9.5 p | 14.4 | 33 | | 25 | ≤10 | | |

Solvent:
10% DTDA
5% Decyl alcohol
85% Escaid 110

TABLE 4C

SOLVENT EXTRACTION SUMMARY
ALKALINE LEACH SOLUTIONS

| Test | | Temp | | Mo Content, g/l | | $H_2SO_4$ | Impurities In strip, mg/l per 200 g/l Mo | | | | |
|---|---|---|---|---|---|---|---|---|---|---|---|
| No | pH | °C. | | Organic | Aqueous | g/g Mo | Si | As | P | Re | SO4 |
| 1110 | | 35 | Feed | | 65 | | 56 | 6 | | | |
| | 2.1 | | Loaded Stage,120 seco | 35.3 | 13 | | | 4 | | | |
| | | | First Strip Stage, 8.5 pH | 4.1 | 35 | | 183 | ≤10 | | | |
| | | | Second Strip Stage, 9.5 | 2.9 | 1.3 | | <300 | 300 | | | |
| | 2.1 | | Loaded Stage, 60 secon | 22.5 | 31 | | 20 | 4 | | | |
| | | | First Strip Stage, 8.5 pH | 3.4 | 45 | | 187 | 9 | | | |
| | | | Second Strip Stage, 9.5 | 2.9 | 1.5 | | <250 | <250 | | | |
| | 2.1 | | Loaded Stage,30 secon | 23.4 | 30 | | 12 | 4 | | | |
| | | | First Strip Stage, 8.5 pH | 3.7 | 46 | | 174 | 9 | | | |
| | | | Second Strip Stage, 9.5 | 3.3 | 1.2 | | <300 | <300 | | | |
| | 2.1 | | Loaded Stage, 15 secon | 16.8 | 40 | | 20 | 4 | | | |
| | | | First Strip Stage, 8.5 pH | 0 | 65 | | 197 | 6 | | | |
| 1150 | | 50 | Feed | | 85 | | 110 | 8 | | 12 | |
| | 3.0 | | Loaded Stage | 41.5 | 22 | | ≤2 | 6 | 1 | | |
| | 3.1 | | Raffinate Stage | 0.04 | 0.07 | | ≤2 | 6 | | | |
| | | | First Strip Stage, 8.5 pH | 1.3 | 76 | | <5 | 11 | 16 | 42 | 470 |
| | | | Second Strip Stage, 9.5 | 0.3 | 2.8 | | <140 | <140 | <70 | <140 | 1500 |
| 1160 | | 50 | Feed | | 82 | | 110 | 8 | | 12 | |
| | 3.52 | | Loaded Stage | 39.3 | 23 | | ≤2 | 6 | 1 | | |
| | 3.66 | | Raffinate Stage | 0.01 | 0.04 | | ≤2 | 6 | | | |
| | | | First Strip Stage, 8.5 pH | 2.1 | 76 | | <5 | 11 | 13 | 63 | 320 |
| | | | Second Strip Stage, 9.5 | 0.6 | 4 | | <100 | <100 | <50 | <100 | 1700 |
| 1170 | | 35 | Feed | | 82 | | 110 | 8 | | 12 | |
| | 2.5 | | Loaded Stage | 40.7 | 20 | | ≤2 | 6 | | 8 | |
| | | | First Strip Stage, 8.5 pH | 1.6 | 81 | | 197 | 15 | 3.7 | | |
| | | | Second Strip Stage, 9.5 | 0.3 | 3.7 | | 750 | 110 | 16 | | |

The effect of contact time on the molybdenum and impurity transfer was also evaluated. As the contact time was reduced from 120 to 15 seconds, the molybdenum transfer was reduced from 80% to 40%. The ratios of silicon and arsenic to molybdenum in subsequent strip solutions did not change, indicating that varying contact time would not vary the amount of impurity transferred.

The transfer of sulfate to the strip solutions was also monitored. The pH of the extraction contact was increased. Increasing the pH of the contact reduced the amount of sulfate transferred. The silicon transfer also was reduced in the higher pH contacts. The amount of sulfate transferred to the strip ranged from 320 to 470 mg/l when normalized to 200 g/l molybdenum.

The effect of temperature (25, 35, and 50° C.) at pH levels of 2.5 to 3.5 was also evaluated. Within these ranges, temperature and pH appeared to have no effect on the molybdenum transfer. Phase separation was slightly faster at 50° C. The transfer of silicon was lower at 50° C. Sulfate transfer at 50° C. and 3.0 to 3.5 pH was low. Strip solutions contained 320 to 470 mg/l $SO_4$ on a 200 g/l molybdenum basis.

A batch contact test was done at the pH found most efficient for molybdenum transfer, 4.2–4.4. The first contact distribution coefficient was 133. The first contact aqueous phase contained 0.13 g/l Mo, indicating 99.8% extraction in the first contact. The transfer of silicon was reduced significantly to 164 mg/l in the strip solution when normalized to 200 g/l Mo. Sulfate transfer also was reduced to 39 mg/l on a 200 g/l Mo basis.

Example 4
Countercurrent Solvent Extraction

Two countercurrent extractions were performed and the data from these tests are summarized in Table 5. In both tests a single extraction contact was made. The target pH in the extraction stage was 4.0 to 4.3. The actual pH values of the eight contacts ranged from 2.3 to 4.3, with only one contact being at a pH lower than 3.7. In this pH range it is easy to add excess acid

TABLE 5

COUNTERCURRENT SOLVENT EXTRACTION
ALKALINE LEACH SOLUTIONS

Test No: 1390

| | | | | NaOH Leach | |
|---|---|---|---|---|---|
| Organic: | 10% DTDA | Aqueous: | | 55 g/l Mo | |
| | 5% Decyl alcohol | | | g/l Fe | |
| | 85% Escaid 110 | | | g/l H2SO4 | |
| | | | | mg/l Si | |

| | Contact | Loaded Stage Mo, g/l | | Strip Prod Impurities on 200 g/l Mo basis | | | |
|---|---|---|---|---|---|---|---|
| | pH | Aqueous | Organic | Mo, g/l | Si, mg/l | As, mg/l | P, mg/l |
| Cycle 1 | 2.3 | 0.037 | | 217 | 180 | 6 | |
| Cycle 2 | 4.0 | 0.060 | | 224 | 195 | 9 | |
| Cycle 3 | 4.3 | 0.49 | | 221 | 360 | 17 | |
| Cycle 4 | 3.8 | 0.023 | | 226 | 195 | 37 | |

Test No: 1400

| | | | | NaOH Leach | |
|---|---|---|---|---|---|
| Organic: | 10% DEHPA | Aqueous: | | 73 g/l Mo | |
| | 5% Decyl alcohol | | | 275 mg/l Si | |
| | 85% Escaid 110 | | | 3 mg/l P | |
| | | | | 6 mg/l As | |
| | | | | 1700 mg/l SO4 | |

| | Contact | Loaded Stage Mo, g/l | | Strip Prod Impurities on a 200 g/l Mo basis | | | | |
|---|---|---|---|---|---|---|---|---|
| | pH | Aqueous | Organic | Mo, g/l | Si, mg/l | As, mg/l | P, mg/l | SO4, mg/l |
| Cycle 1 | 3.7 | 14.6 | | 222 | 240 | 5 | 3 | 65 |
| Cycle 2 | 4.1 | 12.9 | | 228 | 720 | 5 | 1 | 23 |
| Cycle 3 | 4.2 | 13.8 | | 226 | 620 | 7 | 3 | 95 |
| Cycle 4 | 4.1 | 14.5 | 22.7 | 220 | 645 | 5 | 2 | 79 | once the needs for species change were met. Controlling the pH would not be a problem in a continuous circuit.

The loaded solvent was water-washed and stripped countercurrently with three stages of ammonium hydroxide. Each test was operated for four cycles. With countercurrent stripping it was possible to produce product strip solutions containing up to 228 g/l Mo. The transfer of sulfate was low, 23 to 95 mg/l on a 200 g/l Mo basis. The strip solutions were well below the target values of phosphorus and arsenic (1–3 and 5–7 mg/l respectively), but contained 240 to 720 mg/l silicon.

Example 5

Sulfate Removal from Pressure Oxidation Residue

Two washing/re-pulping tests were performed to study removal of sulfate from the autoclave discharge. The results of these tests are shown in Table 6.

TABLE 6

| | Test 1 | Test 2 |
|---|---|---|
| | Soluble SO4 per 200 g/l Mo when leached | |
| Initial filter cake | 250 g/l | 250 g/l |
| After 2 displacement washes | 12.3 g/l | 5.3 g/l |
| Cake after one repulp | <4.8 g/l | 0.73 g/l |
| After 2 displacement washes | <1.4 g/l | 0.11 g/l |

Example 6

Ammoniacal Leaching

A series of tests were performed to determine the optimum conditions for ammoniacal leaching of the autoclave residue. The ammoniacal leaching data are summarized in Table 7. The first set of tests evaluated leaching POX residues by adding the wet cake to reagent ammonium hydroxide (nominally 500 g/l $NH_4OH$). The initial ammonium hydroxide additions were 1.24 and 1.7 times stoichiometric to dissolve the molybdenum. The mixtures then were heated to 55° C. for

TABLE 7

DATA SUMMARY
LEACHING OF AUTOCLAVE RESIDUE WITH AMMONIA

| Test | 40 | 41 | 42 | 43 | 44 | 45 | 46 | 47 |
|---|---|---|---|---|---|---|---|---|
| Temp | 55 | 55 | 55 | 55 | 55 | 55 | 50 | 50 |
| Pulp Density | <43 | <38 | <79 | <79 | <79 | <79 | <82 | <79 |
| Stages | 1 | 1 | 2 | 2 | 2 | 2 | 2 | 2 |
| Hours | 2 | 2 | 2 | 2 | 2 | 2 | 2 | 2 |
| Final pH | 9.4 | 9.0 | 9.0 | 8.5 | 9.4 | 8.8 | 9.0 | 9.1 |
| Added iron molybdate | no | no | no | no | yes | yes | yes | yes |
| Aged overnight | no | yes | yes | yes | yes | yes | yes | yes |
| Feed, % Mo | comp. | comp. | 28.7 | 27.7 | 29.3 | 27.4 | 25.5 | 26.4 |
| Residue, % Mo | 0.46 | 0.64 | 0.16 | 0.09 | 0.10 | 0.25 | 0.29 | 0.68 |
| Ammonia soluble, % | 99.0 | 98.4 | 99.7 | 99.8 | 99.8 | 99.5 | 99.3 | 98.3 |
| Filtrate, g/l Mo | 31.8 | 73.7 | 178 | 142 | 158 | 182 | 184 | 181 |
| Impurities per 200 g/l Mo | | | | | | | | |
| Si | 226 | 190 | 103 | 85 | 56 | 48 | 74 | 82 |
| As | <13 | 33 | 9 | 8.5 | 10 | 11 | 11 | 13 |
| P | na | 5 | | | 6 | 7 | 7 | 8 |
| Cu | 19 | 16 | 4.5 | 8.5 | 11 | 12 | 14 | 14 |
| Fe | 132 | na | 5.6 | 7 | 4 | 3 | 1 | 1 |
| K | | | <1 | <1 | 1 | 1 | | |
| Mg | | | 2 | 3 | 3 | 2 | | |
| SO₄ | | | | | 380 | <330 | 1300 | 4240 | two hours and, if necessary, ammonium hydroxide was added to keep the pH above 9.0. The total ammonium hydroxide additions were 1.7 and 3.5 times stoichiometric to dissolve the molybdenum. After the leaching period, the leach slurries were transferred to plastic bottles, sealed, and aged overnight at 50° C. The molybdenum dissolutions were both excellent at 99.7 and 99.8%. The leach filtrates contained 178 and 142 g/l Mo. The soluble impurities on a 200 g/l Mo basis, except for silicon were low at 85–103 mg/i Si, 8.5–9 mg/l As, 2–3 mg/l Mg, <1 mg/l K, 4.5–8.5 mg/i Cu, and 5.6–7 mg/l Fe.

The next set evaluated adding iron molybdate and sodium sulfide to the leach slurry prior to the aging period. The initial ammonium hydroxide additions were 1.08 and 1.17 times stoichiometric to dissolve the molybdenum. The mixtures then were heated to 55° C. for two hours and, if necessary, ammonium hydroxide was added to keep the pH above 9.0. The total ammonium hydroxide additions were 2.0 and 1.8 times stoichiometric to dissolve the molybdenum. At 90 minutes iron molybdate was added to the leach slurry and at 105 minutes sodium sulfide was added to the leach slurry. At 120 minutes, the leach slurries were transferred to plastic bottles, sealed, and aged overnight at 50° C. The molybdenum dissolutions were both excellent at 99.8 and 99.5%. The leach filtrates contained 158 and 182 g/l Mo. The soluble impurities on a 200 g/l Mo basis were low at 48–56 mg/l Si, 10–11 mg/l As, 2–3 mg/l Mg, 1 mg/l K, 6–7 mg/l P, 11–12 mg/l Cu, and 34 mg/l Fe. The sulfate levels were 380 and less than 330 mg $SO_4$/l.

The last set evaluated using anhydrous ammonia to adjust the pH after the initial pulping in ammonium hydroxide solution. The initial ammonium hydroxide additions were 1.65 and 1.72 times stoichiometric to dissolve the molybdenum. The mixtures then were heated to 55° C. for two hours and, if necessary, anhydrous ammonia was added to keep the pH above 9.0. At 90 minutes a small amount of iron molybdate cake was added to the slurry. After the leaching period, the leach slurries were transferred to plastic bottles, sealed, and aged overnight at 55° C. The molybdenum dissolutions were both excellent at 99.3 and 98.3%. The leach filtrate contained 184 and 181 g/l Mo. The soluble impurities on a 200 g/l Mo basis were 74–82 mg/l Si, 11–13 mg/l As, 7–8 mg/l P, 14 mg/l Cu, and 1 mg/l Fe. The sulfate levels in the leach solution were high, 1300 and 4240 mg/l $SO_4$, even though the POX residue had been washed, repulped, refiltered and rewashed.

Example 7
Purification of Ammonia Leach Solutions

Tests were performed to evaluate purification of leach solutions with high molybdenum concentration, 142–223 g/l Mo. Data are summarized in Table 8. Additives evaluated included ferric sulfate, magnesium sulfate, iron molybdate, and aluminum molybdate. Ferric sulfate and iron molybdate were effective in reducing the silicon by 50 to 70%. Magnesium sulfate had little effect, although the final pH values were below the hydrolysis point of magnesium hydroxide. Aluminum molybdate showed little effect. The addition of iron molybdate successfully reduced the silicon to below the target concentration with each of the solutions. The iron molybdate for the above tests was prepared by mixing solutions of ferric sulfate or ferric chloride with a sodium molybdate solution while controlling the pH at 1.6 to 1.9.

Example 8
Total Soda Leach (TSL) Process

A series of tests were performed to determine the optimum conditions for neutralizing the autoclave leach slurry prior to solid-liquid separation. The data are summarized in Table 9. This process eliminates one liquid-solid separation step when compared with the alkaline leaching process. Sodium carbonate was added to a fixed pH, 6.0 to 8.0, and then in some cases sodium hydroxide was added to pH 9.0. The data in Table 9 show that the final pH needs to be at least 9.0 for the molybdenum solubility to exceed 90%. The quantities of soluble impurities in the neutralized solution were very low as shown in Table 10. Tests on leach slurries No. 164 and 165 focused on determining the lowest cost combination of sodium carbonate and sodium hydroxide that could be used for the neutralization. Because of the formation of bicarbonate, using sodium carbonate is not as cost effective at higher pH values as sodium hydroxide. The

TABLE 8

PURIFICATION OF AMMONIUM HYDROXIDE LEACH

| Test | | P-41 | P-43 | P-45 | | P-42 | P-44 | P-46 | P-47 | P-48 | | P-49 | |
|---|---|---|---|---|---|---|---|---|---|---|---|---|---|
| Temp | | 50 | 50 | 50 | 50 | 50 | 50 | 50 | 50 | 50 | | 50 | |
| pH | 9.0 | 7.4 | 7.5 | 7.3 | 9.0 | 7.4 | 7.4 | 7.4 | 8.0 | 8.5–9.0 | 9.5 | 8.5–9.0 | 8.9 |

TABLE 8-continued

PURIFICATION OF AMMONIUM HYDROXIDE LEACH

| Test | P-41 | P-43 | P-45 | P-42 | P-44 | P-46 | P-47 | P-48 | | P-49 | |
|---|---|---|---|---|---|---|---|---|---|---|---|
| Addition, g/l | | | | | | | | | | | |
| Iron molybdate | 28 g wet | | | 40 g wet | | | | 20 g wet | | 10 g wet | |
| Ferric sulfate | | 10 | | | 14 | | | | | | |
| Magnesium sulfate hyd | | | 12 | | | 16 | 12 | | | | |
| Aluminum molybdate | | | | | | | | | | | |
| | Feed | Filtrate | Filtrate | Filtrate | Feed | Filtrate | Filtrate | Filtrate | Filtrate | Feed | Filtrate | Feed | Filtrate |
| Molybdenum, g/l | 142 | 132 | 100 | 155 | 178 | 170 | 134 | 168 | 157 | 184 | 180 | 181 | 180 |
| Impurities per 200 g/l Mo | | | | | | | | | | | | | |
| Si | 85 | 42 | 28 | 88 | 103 | 38 | 48 | 114 | 84 | 74 | 40 | 82 | 27 |
| As | 8 | 9 | 12 | 8 | 9 | 7 | 9 | 7 | 8 | 11 | 7 | 13 | 4 |
| P | 6 | 5 | 12 | 6 | 6 | 5 | 10 | 6 | 5 | 7 | | 8 | |
| Cu | 8 | 8 | 12 | 9 | 4 | 4 | 9 | 7 | 8 | 14 | 9 | 14 | 9 |
| Fe | 7 | 9 | 8 | 8 | 6 | 22 | 12 | 7 | 5 | 1 | | 1 | |
| K | 1 | 2 | 2 | 1 | 1 | 1 | 1 | 1 | 1 | | | | |
| Mg | 3 | 3 | 32 | 1400 | 2 | 2 | 15 | 1400 | 1300 | | | | |
| SO$_4$ | | | | | | | | | | 1304 | | 4243 | |

TABLE 9

SUMMARY OF TSLP LEACH AND NEUTRALIZATION

| Leach No.: | Conc. Feed | Filtrate, g/l | | | Soluble Mo, % | Residue, S % | | Temp °C. | Na2CO3 to ? pH | NaOH to ? pH | Filtrate Mo, g/l | Residue, % | | Soluble Mo, % |
|---|---|---|---|---|---|---|---|---|---|---|---|---|---|---|
| | | Mo | Cu | H2SO4 | | AC | A Res | | | | | Mo | Cu | |
| 157 | 1B | 7.1 | 8.5 | 65 | 98.2 | | | 25 | 7.0 | | 12.6 | 5.6 | 5.1 | 68 |
| | | | | | | | | | 8.0 | | 14.9 | 4.1 | 5.8 | 77 |
| | | | | | | | | | 8.0 | 9.0 | 24.6 | 3.2 | 4.7 | 84 |
| 158 | 1B | 14.7 | 6.7 | 44 | 99.7 | | | 25 | 7.0 | | 8.4 | 8.6 | 4.3 | 45 |
| | | | | | | | | | 8.0 | | 14.8 | 4.8 | 4.7 | 74 |
| | | | | | | | | | 8.0 | 9.0 | 23.8 | 2.3 | 4.6 | 87 |
| 160 | 1B | 20.5 | 9.0 | 53 | 89.3 | 1.86 | 1.66 | 25 | 6.0 | 9.0 | 16.8 | 4.9 | 4.1 | 74 |
| 161 | 1B | 5.1 | 7.1 | 73 | 99.3 | 0.81 | 0.01 | 25 | 6.0 | 9.0 | 17.0 | 2.2 | 4.9 | 92 |
| 162 | 4A | 9.1 | 6.5 | | 99.8 | 0.81 | 0.10 | 25 | 6.0 | 9.0 | 18.2 | 5.2 | 11.1 | 91 |
| 163 | 4A | 6.1 | 8.8 | | 99.9 | 0.10 | 0.12 | 25 | 6.0 | 9.0 | 19.0 | 3.8 | 11.3 | 93 |
| 164 | 2B | 7.0 | 3.8 | 84 | 99.9 | 0.25 | 0.01 | 35 | | 9.0 | 33.1 | 2.6 | | 94.4 |
| | | | | | | | | 35 | | 10.0 | 35.7 | 2.0 | | 95.6 |
| | | | | | | | | 55 | | 9.0 | 30.2 | 3.7 | | 92.0 |
| | | | | | | | | 55 | | 10.0 | 33.2 | 0.6 | | 98.8 |
| | | | | | | | | 75 | | 9.0 | 36.3 | 2.3 | | 95.1 |
| | | | | | | | | 75 | | 10.0 | 35.0 | 2.0 | | 95.4 |
| | | | | | | | | 55 | 6.0 | 9.0 | 20.8 | 0.8 | | 98.5 |
| | | | | | | | | 55 | 6.0 | 10.0 | 21.0 | 0.3 | | 99.5 |
| | | | | | | | | 75 | 6.0 | 9.0 | 27.9 | 1.3 | | 97.1 |
| | | | | | | | | 75 | 6.0 | 10.0 | 29.8 | 0.3 | | 99.5 |
| 165 | 2B | 7.6 | 7.2 | 93 | 99.0 | 0.37 | 0.01 | 55 | 6.0 | 10.0 | 24.6 | 1.3 | 5.7 | 96.4 |
| | | | | | | | | 65 | 6.0 | 10.0 | 34.7 | 1.5 | 5.9 | 96.3 |

TABLE 10

IMPURITIES IN TSLP ALKALINE FILTRATE

| Leach No.: | Conc. Feed | Temp °C. | Neutralization | | Residue Solids | Soluble Mo | Filtrate Mo, g/l | Filtrate Impurities, mg/l | | | | | | | |
|---|---|---|---|---|---|---|---|---|---|---|---|---|---|---|---|
| | | | Na$_2$CO$_3$ to ? pH | NaOH to ? pH | | | | Cu | Fe | As | Al | P | Se | Mg | Si |
| 157 | 1B | 25 | 7.0 | | 62% | 68% | 12.6 | 6 | 1 | 4 | 2 | <1 | | | |
| | | | 8.0 | | 63% | 77% | 14.9 | 8 | 1 | 6 | 1 | <1 | | | |
| | | | 8.0 | 9.0 | 70% | 84% | 24.6 | 110 | 2 | 8 | 2 | 2 | | | |
| 158 | 1B | 25 | 7.0 | | 52% | 45% | 8.4 | 2 | 1 | 4 | 2 | <1 | | | |
| | | | 8.0 | | 56% | 74% | 14.8 | 5 | 1 | 4 | 2 | <1 | | | |
| | | | 8.0 | 9.0 | 58% | 87% | 23.8 | 47 | 2 | 6 | 2 | 1 | | | |
| 160 | 1B | 25 | 6.0 | 9.0 | 52% | 74% | 16.8 | 2 | 1 | 6 | 2 | | 28 | | |

TABLE 10-continued

IMPURITIES IN TSLP ALKALINE FILTRATE

| Leach No.: | Conc. Feed | Temp °C. | Neutralization Na$_2$CO$_3$ to ? pH | NaOH to ? pH | Residue Solids | Soluble Mo | Filtrate Mo, g/l | Filtrate Impurities, mg/l | | | | | | | |
|---|---|---|---|---|---|---|---|---|---|---|---|---|---|---|---|
| | | | | | | | | Cu | Fe | As | Al | P | Se | Mg | Si |
| 161 | 1B | 25 | 6.0 | 9.0 | 60% | 92% | 17.0 | 1 | 1 | 4 | 2 | | | 76 | |
| 162 | 4A | 25 | 6.0 | 9.0 | 70% | 91% | 18.2 | 6 | 3 | 12 | | 0.4 | 2 | | 28 |
| 163 | 4A | 25 | 6.0 | 9.0 | 78% | 93% | 19.0 | 8.0 | 4.0 | 10.0 | | 0.3 | 4.4 | | 20 |
| 164 | 2B | 35 | | 9.0 | 57% | 94.4% | 33.1 | | | | | | | | |
| | | 35 | | 10.0 | 55% | 95.6% | 35.7 | | | | | | | | |
| | | 55 | | 9.0 | 60% | 92.0% | 30.2 | | | | | | | | |
| | | 55 | | 10.0 | 58% | 98.8% | 33.2 | | | | | | | | |
| | | 75 | | 9.0 | 56% | 95.1% | 36.3 | | | | | | | | |
| | | 75 | | 10.0 | 54% | 95.4% | 35.0 | | | | | | | | |
| | | 55 | 6.0 | 9.0 | 62% | 98.5% | 20.8 | | | | | | | | |
| | | 55 | 6.0 | 10.0 | 58% | 99.5% | 21.0 | | | | | | | | |
| | | 75 | 6.0 | 9.0 | 65% | 97.1% | 27.9 | | | | | | | | |
| | | 75 | 6.0 | 10.0 | 59% | 99.5% | 29.8 | | | | | | | | |
| 165 | 2B | 55 | 6.0 | 10.0 | 66% | 96.4% | 24.6 | | | | | | | | |
| | | 65 | 6.0 | 10.0 | 67% | 96.3% | 34.7 | | | | | | | | | leaching-neutralization tests showed that more than 98% of the molybdenum would be soluble after partial neutralization with sodium carbonate to 6.0 pH, followed by neutralization with sodium hydroxide to 10.0 pH. The cosolubilization of impurities was low, with silicon being the highest at 200 mg/l on a 200 g/l Mo basis. Solvent extraction of molybdenum from the neutralization solution was ideal. When using a 10% DTDA organic phase and controlling the pH at 4.0 to 4.5 in the extraction mixers, the transfer of arsenic, phosphorus, and sulfate is minimized. Silicon transfer was moderate with the subsequent ammonium hydroxide strip solution containing about 21 to 71 mg/l silicon on a 200 g/l Mo basis (50 mg/l silicon was the target maximum). The data indicate two extraction and two strip stages will recover all of the soluble molybdenum into a 200 g/l molybdenum strip solution.

What is claimed is:

1. A method of producing high purity ammonium dimolybdate from low grade molybdenite concentrates comprising:
   a) forming an aqueous slurry of said low grade molybdenite concentrates;
   b) oxidizing said slurry in an atmosphere containing free oxygen at a pressure of at least about 50 p.s.i. and at a temperature of at least about 200° C. and thereafter producing a first discharge with greater than about 99% of the molybdenum in said low grade molybdenite concentrates oxidized and greater than about 80% of molybdenum values insoluble;
   c) filtering said first discharge to produce a first liquid filtrate containing soluble molybdenum values and a first solid filter cake containing the insoluble molybdenum values;
   d) leaching said first solid filter cake with an alkaline solution to produce a second discharge wherein greater than about 98% of the insoluble molybdenum values are solubilized;
   e) filtering said second discharge to produce a second liquid filtrate and a second solid filter cake;
   f) recovering the molybdenum values from said second liquid filtrate by solvent extraction with an organic solvent to produce a first liquor by (1) contacting said second liquid filtrate with said organic solvent to form a two-phase mixture and simultaneously reducing the pH level in said two-phase mixture such that the molybdenum values in said second liquid filtrate are extracted into said organic solvent; and (2) stripping said organic solvent with aqueous ammonia to recover the molybdenum values;
   g) crystallizing said first liquor containing the extracted molybdenum values to produce crystals and a second liquor; and
   h) recovering said high purity ammonium dimolybdate from said crystals.

2. The method of claim 1, wherein the organic solvent contains a secondary amine.

3. The method of claim 2, wherein the organic solvent contains ditridecyl amine.

4. The method of claim 1, wherein the reduced pH level in said two-phase mixture ranges from about 4.0 to about 4.5.

5. The method of claim 1, wherein the reducing is accomplished by adding hydrated sulfuric acid to said two-phase mixture.

6. The method of claim 1, wherein ammonium hydroxide is used during the stripping to recover the molybdenum values.

7. The method of claim 1, wherein the pH level during the stripping is maintained at about 9.0.

8. A method of producing high purity ammonium dimolybdate from low grade molybdenite concentrates comprising:
   a) forming an aqueous slurry of said low grade molybdenite concentrates;
   b) oxidizing said slurry in an atmosphere containing free oxygen at an pressure of at least about 50 p.s.i. and at a temperature of at least about 200° C. and thereafter producing a first discharge with greater than about 99% of the molybdenum in said low grade molybdenite concentrates oxidized and greater than about 80% of molybdenum values insoluble;
   c) separating and filtering said first discharge to produce a first liquid filtrate containing soluble molybdenum values and a first solid filter cake containing the insoluble molybdenum values;
   d) leaching said first solid filter cake with an ammoniacal solution to produce a second discharge wherein greater than about 98% of the insoluble molybdenum values are solubilized;

e) filtering said second discharge to produce a second liquid filtrate and a second solid filter cake;

f) aging said second liquid filtrate;

g) crystallizing said second liquid filtrate to produce crystals and a first liquor; and h) recovering said high purity ammonium dimolybdate from said crystals;

wherein the method further comprises subjecting said first liquid filtrate produced in step (c) to a solvent extraction process to recover molybdenum values, said solvent extraction process comprising contacting said first liquid filtrate with an organic solvent to form a two-phase mixture and simultaneously reducing the pH level in said two-phase mixture such that the molybdenum values in said first liquid filtrate are extracted into said organic solvent, and stripping said organic solvent to produce a second liquor containing the recovered molybdenum values.

9. The method of claim 8, wherein the organic solvent contains a secondary amine.

10. The method of claim 9, wherein the organic solvent contains ditridecyl amine.

11. The method of claim 8, wherein the reduced pH level in said two-phase mixture ranges from about 4.0 to about 4.5.

12. The method of claim 8, wherein the reducing is accomplished by adding hydrated sulfuric acid to said two-phase mixture.

13. The method of claim 8, wherein sulfuric acid is used during the stripping to recover the molybdenum values.

14. The method of claim 8, wherein the pH level during the stripping is maintained at about less than 3.0.

15. The method of claim 8, further comprising recycling a portion of said second liquor back to the aqueous slurry in step (a).

16. The method of claim 8, further comprising subjecting said second liquor to a cementation process to recover copper values, said cementation process comprising adding iron to said second liquor and mixing to produce a first solution, filtering said first solution to produce a third liquid filtrate and a third solid filter cake, and then recovering said copper values from said third solid filter cake.

17. A method of producing high purity ammonium dimolybdate from low grade molybdenite concentrates comprising:

a) forming an aqueous slurry of said low grade molybdenite concentrates;

b) oxidizing said slurry in an atmosphere containing free oxygen at an pressure of at least about 50 p.s.i. and at a temperature of at least about 200° C. and thereafter producing a first discharge with greater than about 99% of the molybdenum in said low grade molybdenite concentrates oxidized and greater than about 80% of molybdenum values insoluble;

c) separating and filtering said first discharge to produce a first liquid filtrate containing soluble molybdenum values and a first solid filter cake containing the insoluble molybdenum values;

d) leaching said first solid filter cake with an ammoniacal solution to produce a second discharge wherein greater than about 98% of the insoluble molybdenum values are solubilized;

e) filtering said second discharge to produce a second liquid filtrate and a second solid filter cake;

f) aging said second liquid filtrate and adding a reagent selected from the group consisting of iron molybdate, ammonium sulfide, sulfide compounds, and ferric sulfate to said second liquid filtrate;

g) crystallizing said second liquid filtrate to produce crystals and a first liquor; and h) recovering said high purity ammonium dimolybdate from said crystals.

18. A method of producing high purity ammonium dimolybdate from low grade molybdenite concentrates comprising:

a) forming an aqueous slurry of said low grade molybdenite concentrates;

b) oxidizing said slurry in an atmosphere containing free oxygen at an pressure of at least about 50 p.s.i. and at a temperature of at least about 200° C. and thereafter producing a first discharge with greater than about 99% of the molybdenum in said low grade molybdenite concentrates oxidized and greater than about 80% of molybdenum values insoluble;

c) leaching said first discharge with an alkaline solution to produce a second discharge wherein greater than about 98% of the insoluble molybdenum values are solubilized;

d) separating and filtering said second discharge to produce a liquid filtrate containing soluble molybdenum values and a solid filter cake containing the insoluble molybdenum values;

e) recovering the molybdenum values from said liquid filtrate by solvent extraction with an organic solvent to produce a first liquor by (1) contacting said liquid filtrate with said organic solvent to form a two-phase mixture and simultaneously reducing the pH level in said two-phase mixture such that the molybdenum values in said liquid filtrate are extracted into said organic solvent; and (2) stripping said organic solvent with aqueous ammonia to recover the molybdenum values;

f) crystallizing said first liquor containing the extracted molybdenum values to produce crystals and a second liquor; and g) recovering said high purity ammonium dimolybdate from said crystals.

19. The method of claim 18, wherein the organic solvent contains a secondary amine.

20. The method of claim 19, wherein the organic solvent contains ditridecyl amine.

21. The method of claim 18, wherein the reduced pH level in said two-phase mixture ranges from about 4.0 to about 4.5.

22. The method of claim 18, wherein the reducing is accomplished by adding hydrated sulfuric acid to said two-phase mixture.

23. The method of claim 18, wherein ammonium hydroxide is used during the stripping to recover the molybdenum values.

24. The method of claim 18, wherein the pH level during the stripping is maintained at about 9.0.

* * * * *